United States Patent [19]

Puigcerver et al.

[11] Patent Number: 4,880,676
[45] Date of Patent: Nov. 14, 1989

[54] CABLE SEALING APPARATUS

[75] Inventors: Luis Puigcerver, Fuquay-Varina, N.C.; Gerald Shimirak, Danville, Calif.; Jorgen Berth, Kvistgaard, Denmark

[73] Assignee: Raychem Corporation, Menlo Park, Calif.

[21] Appl. No.: 177,718

[22] Filed: Apr. 5, 1988

[51] Int. Cl.$^4$ .............................................. H02G 15/08
[52] U.S. Cl. ..................... 428/35.7; 174/77 R; 174/91; 174/92; 174/93; 428/36.92; 428/167
[58] Field of Search .................. 174/93, 77 R, 91, 92; 428/35.7, 36.92, 167

[56] References Cited

U.S. PATENT DOCUMENTS 4,079,189 3/1978 Troccoli .................................. 174/93
4,701,574 10/1987 Shimirak et al. ...................... 174/93
4,751,350 6/1988 Eaton .................................... 174/93

Primary Examiner—Ellis P. Robinson
Assistant Examiner—James J. Seidleck
Attorney, Agent, or Firm—A. Stephen Zavell; Herbert G. Burkard

[57] ABSTRACT

A cable splice case comprises end seals that surround the cables either side of the splice and a housing that extends from one to the other around the splice. The end seals comprise gel having a convoluted outer surface and having internal non-planar ribs.

24 Claims, 4 Drawing Sheets

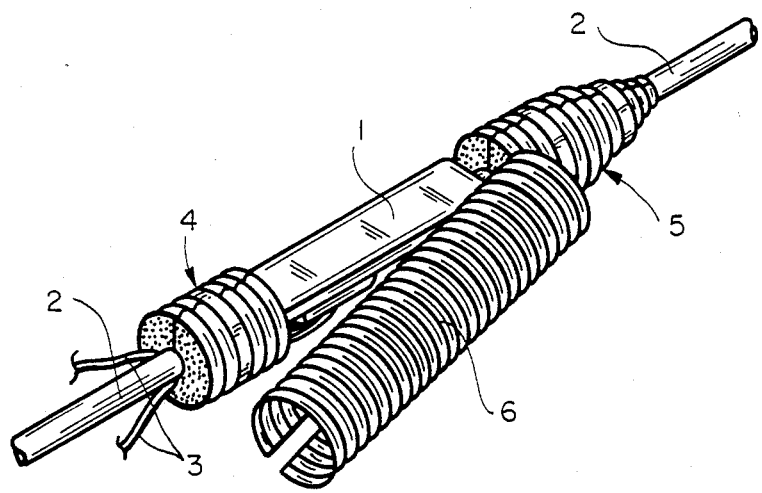
FIG_IA
(PRIOR ART)
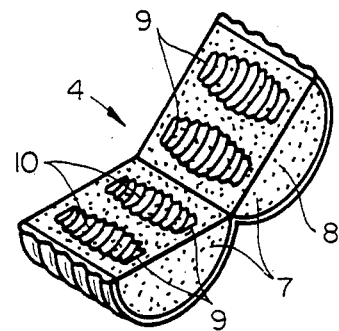
FIG_IB
(PRIOR ART)

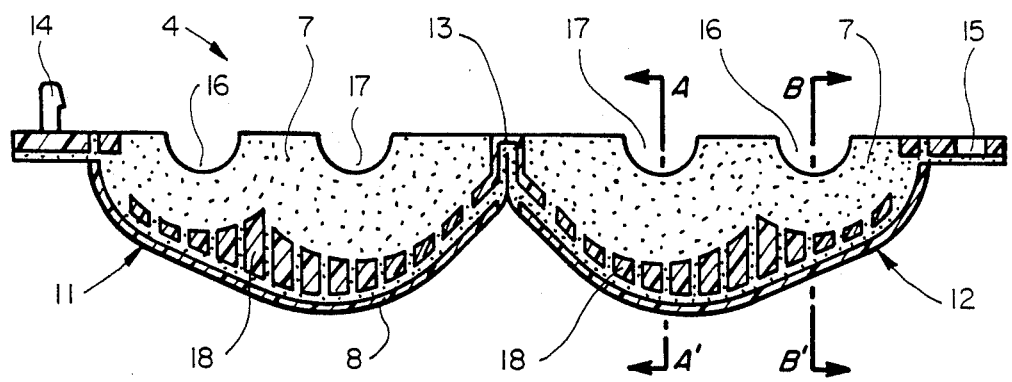
FIG_2
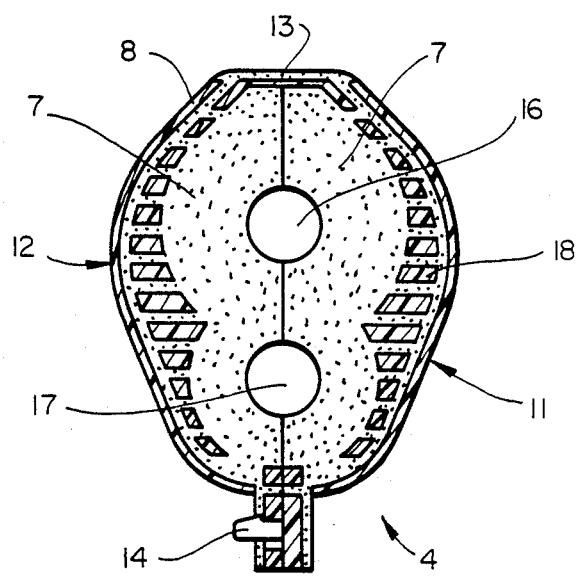
FIG_3

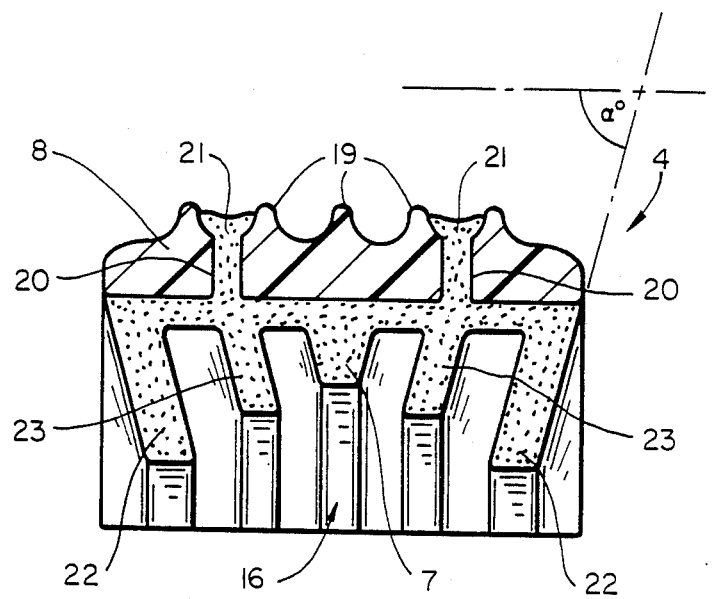
FIG_4
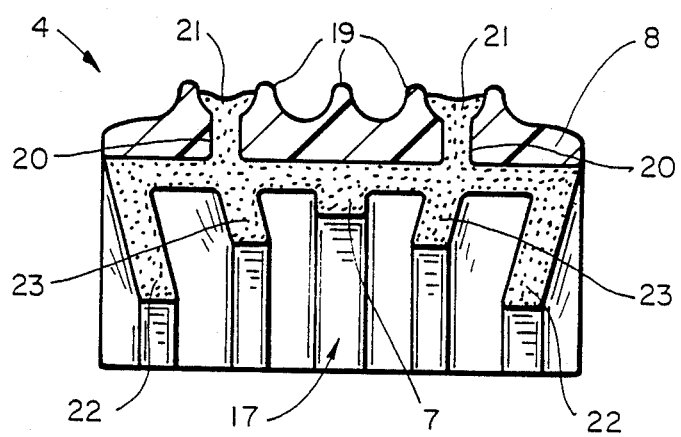
FIG_5

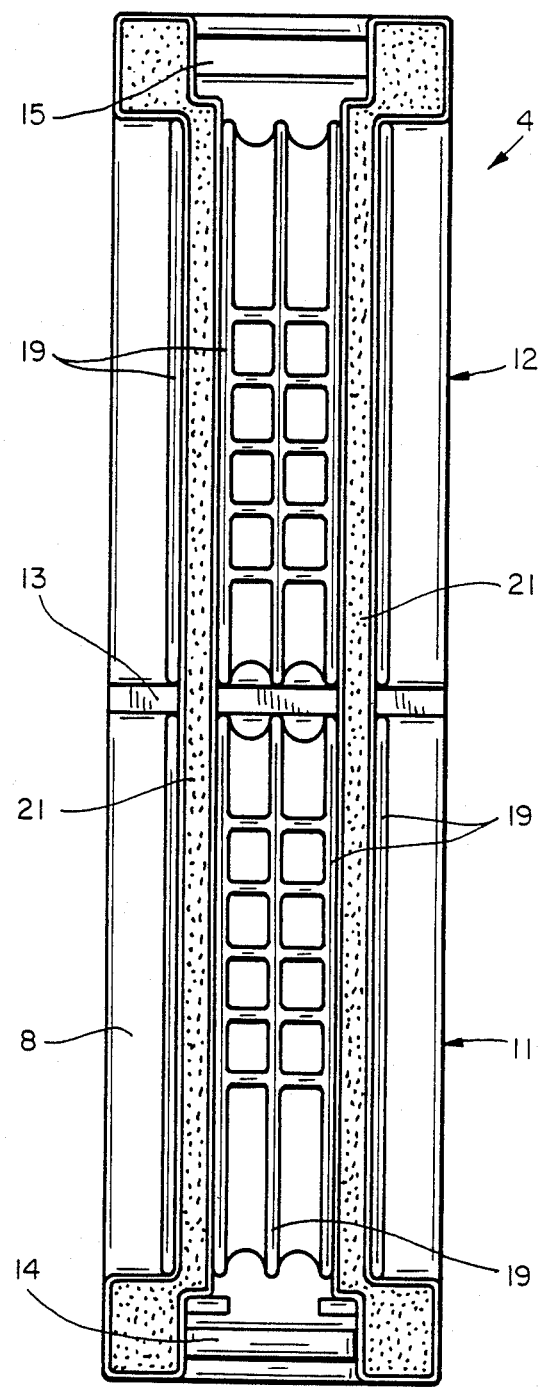
FIG_6

CABLE SEALING APPARATUS

FIELD OF THE INVENTION

The present invention relates to cable sealing apparatus, comprising end seals for sealing the cables and housings usable therewith.

BACKGROUND OF THE INVENTION

Various closures are known in the art for enclosing junctions in cables. The prior art closures suffer from the common drawback that they are relatively complicated in design, complicated to install, and accordingly unduly expensive. In addition, these closures have the further drawback that they are not easily adaptable for accommodating a wide range of junction and cable sizes, and accordingly, a craftsman needs to obtain numerous different closure sizes. In addition, end seals usable with such closures are generally not efficient or effective in keeping water out of the junction being enclosed.

Many of the above-noted drawbacks are eliminated in a design disclosed in EP0191609 (Raychem), which may be used with a cable splice case housing.

Accordingly, that prior document discloses a cable sealing apparatus, comprising:
a first end seal, the first end seal comprising:
a layer of precured gel, the gel being cured prior to contacting a cable to be sealed, the gel being elastic, conformable, having a cone penetration between 80 and 350 ($10^{-1}$ mm), an ultimate elongation in excess of 50%, the gel preferably being disposed in a flexible matrix having an average volume of less than 0.01 inches$^3$ with the gel preferably including a plurality of interconnected segments which lie within the interstices of the matrix, the gel further preferably being such that when the gel and matrix are stretched, the matrix reaches its ultimate elongation before the gel reaches its ultimate elongation; the layer of gel including means formed therein for passage of a cable therethrough between inner and outer opposite faces of the gel; and
means forming an outer circumferential convoluted surface of the first end seal, the convolutions extending circumferentially around the end seal.

Since the gel creates an excellent moisture barrier against axial water propagation along an outer surface of the cable, and since the convolutions produce an excellent water barrier against water propagating down an outer surface of the end seal, excellent water isolation of a junction for any cable to sealed results.

Such an end seal is used where a cable splice is to be sealed against the environment. The splice may simply be a 1:1 in-line splice where two cables are joined end-to-end, or it may be a branched splice where two cables are joined to one, or where one cable is joined to an intermediate position along another. In each case an environmental seal, called a splice case, has to be built around the part of the cable or cables where cable jacket is missing. An end seal as described above is positioned around a cable at each side of the splice, and a cable splice case housing is provided that extends from one end to the other, bridging the splice between them.

In general, the circumferential surface of the end seal may be a surface of the gel, or may be provided by an outer casing having a convoluted outer surface.

The end seals are especially usable in closures for enclosing a splice along cables, in which case the assembly may further include a slit (and therefore "wrap-around") convoluted tube or other splice case housing for engagement with first and second end seals disposed on opposite sides of the splice. The convoluted tube engaging the end seals may have the additional features of being flexible, capable of stretching or contracting due to the convolutions, of being suitably crush resistant, and of being capable of being cut to any appropriate length in the field due to its uniform construction. Furthermore, it may be easily installable by simply prying open the slit thereof, and wrapping the tube around the cable. The term "wrap-around" is well known in the cable splice case art.

BRIEF DESCRIPTION OF THE INVENTION

Improvements have now been made to the above-mentioned design which can further improve performance, facilitate installability and allow a given end seal to be installed over a wider range of cable sizes.

Thus, in a first embodiment, the invention provides a cable sealing apparatus, comprising a first end seal that can be positioned around a first cable and that can support a cable splice case housing, the first end seal comprising:
(a) a gel, (for example a precured gel, the gel being cured before contacting a cable to be sealed) having a cone penetration value as measured according to ASTM D217-68 at 21° C. of 50-200 ($10^{-1}$ mm) and an ultimate elongation as measured according to ASTM D638-80 at 21° C. of at least 50%, the gel having a first aperture through which the first cable can pass, which aperture has a substantially annular non-planar internal rib, and
(b) means forming a convoluted outer surface of the first end seal, the convolution extending circumferentially around the end seal.

In a second embodiment, the invention provides a cable sealing apparatus comprising a first end seal that can be positioned around first and second side-by-side cables and that can support a cable splice case housing, the first end seal comprising:
(a) a gel, (for example a precured gel, the gel being cured before contacting a cable to be sealed) having a cone penetration value as measured according to ASTM D217-68 at 21° C. of 50-200 ($10^{-1}$ mm) and an ultimate elongation as measured according to ASTM D638-80 at 21° C. of at least 50%, the gel having a first aperture through which the first cable can pass and a second aperture through which the second cable can pass; and
(b) a casing that at least partially surrounds the gel, that has an external circumferentially-extending convolution, and that has means for resisting displacement of the gel away from a position between the first and second apertures.

In a third embodiment, the invention provides a cable sealing apparatus comprising a first end seal that can be positioned around a first cable and that can support a cable splice case housing, the first end seal comprising:
(a) a gel, (for example a precured gel, the gel being cured before contacting a cable to be sealed) having a cone penetration value as measured according to ASTM D217-68 at 21° C. of 50-200 ($10^{-1}$ mm) and an ultimate elongation as measured according to ASTM D638-80 at 21° C. of at least 50%, the gel having a first aperture through which the first cable can pass; and (b) a casing that at least partially surrounds the gel, that has an external circumferentially-extending convolution, and that has an aperture through the thickness thereof through which the gel extends to contact circumferentially-extending gel at an external surface of the casing, preferably adjacent said convolution.

In the first embodiment, a better seal compared with prior art having planar ribs may be obtained around the cables and a wider range of sizes of cables may be sealed by a given end seal. Also less precision is required as regards cable placement within the seal, and the seal is more tolerant of cable movement.

In the second embodiment two side-by-side cables can be sealed reliably, and a seal to a single cable may be better sealed using the new design than an old design employing two apertures but no means for resisting gel displacement. This may be important since, in order to reduce inventory and to unify installation techniques, a single design of end seal may be required for use around single cables and branching side-by-side cables. Then, an end seal may be supplied having two side-by-side apertures, at least one of which is temporarily blocked, the two temporary blocks being removed if two cables are to be sealed. A temporary block may comprise a web of gel, which can be cut away if desired.

The third embodiment improves a seal between the end seal and a splice case housing supported by the end seal, and it can also help locate the gel with respect to a casing.

In each embodiment the way in which the gel functions to provide a seal has been modified, but in such a way that the physical properties of the gel are made use of. The design of splice case with which we are concerned makes possible the incorporation of two, and preferably all three, of these embodiments, thus making full use of the beneficial properties of the gel. The combination of these three embodiments in a single product is therefore a significant one.

The end seal is preferably of wraparound design, and it may comprise two halves that are hinged together, and that can therefore be closed like a clam-shell around the cable. The gel may be at least partially surrounded by a casing, which may comprise two halves joined, for example, by a live hinge. Each half of the casing may carry gel, the gel in each half having therein a semi-cylindrical, or other shaped, aperture bearing a semi-annular rib, such that when the casing is closed (is in the "wrapped around" configuration) an aperture is created that is, for example, cylindrical and bears the annular rib referred to. The aperture may be other than cylindrical (the rib is to be ignored when interpreting such references to shape, since if the rib is taken into consideration a portion of the aperture clearly will not be cylindrical), for example it may be barrel-shaped, being narrow at its ends, or it may be the inverse of that namely narrower at its center, or it may be conical or frusto-conical. A variation in size along the length of the aperture may be desirable to increase the range of cable sizes that can be sealed by a given end seal. Furthermore, we prefer that the end seal have more than one said rib, particularly 2-10, and also that the ribs be of different internal diameter (i.e. there is a different size passage through different ribs). The envelope of the distal edges (the peaks) of the ribs may then be barrel shaped or have any of the shapes mentioned above, in which case proximal edges (at the troughs) of the ribs may lie on a cylindrical surface.

The ribs are preferably substantially the shape of the curved surface of a frustum, and the angle between the rib and a longitudinal axis of the aperture is preferably 80° or less, more preferably 75° or less. (When we refer to the rib being non-planar, we require only one surface to be nonplanar (although it is preferably of substantially uniform thickness, say at least 2 mm, especially at least 4 mm and then both surfaces will be non-planar).

References herein to the shape of the rib or aperture are to be interpreted bearing in mind the nature of the gel in which they are formed, and bearing in mind the optionally wrap-around form of the end seal. The material may be quite soft, and although preferably elastomeric, may be easily deformed and may remain at least slightly deformed. Also, the seal need not be manufactured to a precise geometrical shape since its deformability avoids the need for close tolerances between it and the cables it is to seal. This is of course an advantage of the type of material and seal design defined above.

The gel preferably has the following properties. Its cone penetration is preferably 50-150 ($10^{-1}$ mm), more preferably 50-110, especially 55-90. Ultimate elongation is preferably at least 100%, particularly at least 200%, especially at least 500%, typically at least 1000%. The material is preferably elastomeric.

A preferred gel is one based on polyurethane or on silicone. As an example, a material may be mentioned that is made by gelling curable polyurethane precursor materials in the presence of substantial quantities of mineral oil, vegetable oil or plasticizer or mixture of two or more of them. Also, a suitable material may be made by curing reactive silicones with non-reactive extender silicones. Other gels include materials that are not cross-linked (but which have similar properties to the above-mentioned materials and are therefore referred to herein as gels, but are also known as gelloid compositions). For example thermoplastic gels may be made by extending block copolymers, such as styrene-ethylene-butylene-styrene, with a mineral oil. An example of such a copolymer is that known by the Shell Trade Mark Kraton G1651. The material may contain additives such as moisture scavengers (e.g. benzoyl chloride), antioxidants, pigments and fungicides, and those offering UV protection. The material is preferably electrically-insulating, UV-stable and hydrolytically-stable.

BRIEF DESCRIPTION OF THE DRAWINGS

FIGS. 1A and 1B show a prior art end seal and splice case;

FIG. 2 shows a wrap-around end seal of the invention in an open configuration;

FIG. 3 shows the end seal of FIG. 2, but in its wrapped-around configuration;

FIGS. 4 and 5 are sections along lines AA' and BB' of FIG. 2; and

FIG. 6 is a view from below of the open end seal of FIG. 2.

DETAILED DESCRIPTION OF THE DRAWINGS

FIG. 1A shows a prior art splice case. A splice 1 joins two multi-core telecommunications cables 2 and several drop wires 3 which lead off to individual subscribers. First and second end seals 4, 5 are positioned around cables 2 and 3, one either side of the splice 1, and over which a cable splice housing 6 can be positioned. The cable splice 1 is thus sealed from the environment. The housing 6 can be seen to be of wrap-around design, its longitudinal side being opened to allow it to be installed laterally over the end seals 4,5.

A prior art end seal 4 is shown in FIG. 1B. The end seal 4 comprises a gel 7 surrounded and supported by a casing 8. The gel 7 has a pair of apertures 9 therein, bearing planar ribs 10. The end seal is of wrap-around design, it being capable of being closed, clam-shell like, around a cable. The pair of apertures 9 allows two side-by-side, branching, cables to be sealed.

End seals of the invention are shown in FIGS. 2-6. They may be used in a similar way to that shown and described with respect to the prior art, and they may employ a similar housing.

FIG. 2 shows a wrap-around end seal 4 in an open configuration, and FIG. 3 shows the same end seal in a closed configuration. FIGS. 2 and 3 are transverse cross-sections. The end seal comprises two halves 11 and 12, joined together by a live hinge 13. A catch 14 engages a slot 15 to hold the seal in the wrapped-around configuration (FIG. 3) around one or two cables, received in apertures 16, 17. The apertures may be least initially blind (as shown in FIG. 1B), the closed ends of which may if desired, be cut away for receipt of the cables. This design allows an end seal having two apertures to be used around a single cable if desired. The end seal has means for resisting displacement of the gel 7 away from a position between first and second apertures 16, 17. This may help to prevent or reduce the size of any leak path between the cables in apertures 16 and 17. The means for resisting may comprise a ridge 18 running longitudinally along (not necessarily along the entire length, and not necessarily of uniform height) the end seal. The ridge 18 or other means may be part of a casing 8 that surrounds the gel.

The casing 8 need not surround all external surfaces of the gel, and it preferably surrounds the circumferential parts, and does not surround the end faces.

FIGS. 4 and 5 are cross-sections along respectively lines AA' and BB' of FIG. 2. Ribs 22 and 23 can be seen to slope into the apertures 16, 17. The angle alpha i.e. the angle which the ribs make with a longitudinal axis of the aperture, is preferably 80° or less. The ribs are therefore non-planar, and preferably (as shown) have substantially the shape of the curved surface of a frustum (ribs 22, 23 of FIG. 4 and ribs 23 of FIG. 5) or of a cone (ribs 22 of FIG. 5). First ribs 22 of FIG. 4 can be seen to be of different internal diameter than second ribs 23. A third, central, and still smaller rib is also shown. This angling, or non-planar, design of ribs has been found to result in enhanced sealing, ease of installation and has allowed a given size of end seal to accommodate a wider range of cable sizes.

The casing 8 has means 19 that form a convoluted outer surface of the end seal. The convolutions extend circumferentially around the end seal, by which we mean that the ridges 19 that constitute the convolutions extend around, preferably substantially entirely around, the end seal.

The casing 8 can be seen to have apertures 20 through the thickness thereof, into which gel extends thereby locating the gel 7 with respect to the casing. The gel preferably extends through the casing 8 to appear on an external surface thereof as shown at 21. This presence of gel on an external surface of the casing 8 may further locate the gel and/or provide a seal between the end seal 4 and a splice case housing that overlies it (see housing 6 of FIG. 1A). The gel at 21 preferably runs around a trough of convolutions 19 to provide a seal to the housing around substantially the entire circumference of the end seal 4. Gel precursors are preferably cured in contact with the casing, such that the gel 21 is integral with that within the casing forming the ribs.

FIG. 6 is a view from below of the end seal shown in FIG. 2. Thus, the casing 8 of the two halves 11 and 12 is visible. Convolutions 19 are visible, the trough of at least one of which contains gel 7 as shown at 21. The latch 14 and slot 15, and the live hinge 13 are also visible.

We claim:

1. A cable sealing apparatus, comprising a first end seal that can be positioned around a first cable and that can support a cable splice case housing, the first end seal comprising:
    (a) a gel having a cone penetration value as measured according to ASTM D217-68 at 21° C. of 50-200 ($10^{-1}$ mm) and an ultimate elongation as measured according to ASTM D638-80 at 21° C. of at least 50%, the gel having a first aperture through which the first cable can pass, which aperture has a substantially annular internal rib, said rib makes an angle which is less than perpendicular with respect to a longitudinal axis at a base of said rib; and
    (b) means forming a convoluted outer surface of the first end seal, the convolution extending circumferentially around the end seal.

2. An apparatus according to claim 1, in which the rib has substantially the shape of the curved surface of a frustum or of a cone wherein the smaller cross-sectional dimension of said frustum or said cone is interior to a tangent drawn from the edge of the apparatus to perpendicularly bisect the longitudinal axis through said first aperture.

3. An apparatus according to claim 2, in which the first end seal has from 2-10 said ribs.

4. An apparatus according to claim 3, in which the first end seal has first and second said ribs of different internal diameter.

5. An apparatus according to claim 1, in which the rib makes an angle of 80° or less with a longitudinal axis of the aperture.

6. An apparatus according to claim 1, in which the gel has a cone penetration value of from 50-110 ($10^{-1}$ mm).

7. An apparatus according to claim 1, in which the gel has an ultimate elongation of at least 500%.

8. An apparatus according to claim 1, in which the gel has a second aperture therein, through which a second cable can pass, the first and second apertures lying substantially side-by-side, the first end seal having means for resisting displacement of the gel away from a position between the first and second apertures.

9. An apparatus according to claim 8, in which the means for resisting comprises a ridge running longitudinally along the end seal.

10. An apparatus according to claim 1, in which the gel is surrounded at least partially by a casing.

11. An apparatus according to claim 10, in which means (b) comprises circumferential ribs of said casing.

12. An apparatus according to claim 10, in which the casing has an aperture therein into which the gel extends, thereby locating the gel with respect to the casing.

13. An apparatus according to claim 12, in which the aperture in the casing extends through the thickness of the casing, and in which the gel extends to an external surface of the casing.

14. An apparatus according to claim 13, which additionally comprises:
a second said end seal that can be positioned around a cable to which said first cable is spliced; and a splice case housing that can extent from the first to the second end seals, and having at least one convolution at opposite ends thereof that can engage respective convoluted outer surfaces of the first and second end seals.

15. An apparatus according to claim 10, in which the casing has external circumferentially-extending convolutions, a trough thereof containing a sealing material.

16. An apparatus according to claim 15, in which the casing has an aperture through the thickness thereof through which the gel extends to comprise said sealing material 17. An apparatus according to claim 1, which additionally comprises:
a second said end seal that can be positioned around a cable to which said first cable is spliced; and a splice case housing that can extend from the first to the second end seals, and having at least one convolution at opposite ends thereof that can engage respective convoluted outer surfaces of the first and second end seals.

18. An apparatus according to claim 1, in which the first end seal can be wrapped around the first cable and secured in the wrapped-around configuration.

19. A cable sealing apparatus comprising a first end seal that can be positioned around a first cable and that can support a cable splice case housing, the first end seal comprising:
(a) a gel having a cone penetration value as measured according to ASTM D217-68 at 21° C. of 50–200 ($10^{-1}$ mm) and an ultimate elongation as measured according to ASTM D638-80 at 21° C. of at least 50%. the gel having a first aperture through which the first cable can pass; and
(b) a casing that at least partially surrounds the gel, that has at least one external circumferentially-extending convolution, and that has an aperture through the thickness thereof through which the gel extends to contact circumferentially-extending gel at an external surface of the casing.

20. An apparatus according to claim 19 wherein the gel has a second aperture therein through which a second cable can pass and the casing includes means for resisting the displacement of the gel away from the position between the first and second apertures.

21. An apparatus according to claim 3 in which the gel has a second aperture therein through which a second cable can pass, the first and second apertures lying substantially side-by-side, the first end seal having means for resisting displacement of the gel away from the position between the first and second apertures.

22. An apparatus according to claim 15 in which the gel has a second aperture therein through which a second cable can pass and the first end seal includes means for resisting displacement of gel away from a position between the first and second apertures.

23. An apparatus according to claim 16 in which the gel in each of the first and second end seals include a second aperture therein through which a second cable can pass and each of said first and second end seals include means for resisting displacement of the gel away from a position between the first and second apertures.

24. The apparatus according to claim 20 in which the gel in each of the said first and second end seals include a second aperture therein through which a second cable can pass and each of said first and second end seals include means for resisting displacement of the gel away from a position between the first and second apertures.

* * * * *